United States Patent [19]

Bickmore et al.

[11] E Re. 29,357

[45] Reissued Aug. 16, 1977

[54] IMAGE FORMATION AND DEVELOPMENT

[75] Inventors: J. T. Bickmore, Rochester; William L. Goffe, Webster, both of N.Y.

[73] Assignee: Xerox Corporation, Stamford, Conn.

[21] Appl. No.: 267,724

[22] Filed: June 29, 1972

Related U.S. Patent Documents

Reissue of:

[64] Patent No.: 3,518,081
Issued: June 30, 1970
Appl. No.: 345,433
Filed: Feb. 17, 1964

[51] Int. Cl.[2] ..... G03G 13/22; B05D 3/06

[52] U.S. Cl. ..... 96/1 R; 96/115 P; 427/19; 427/56; 427/256

[58] Field of Search ..... 96/1 R, 1.1, 1.3–1.5, 96/115 P, 27; 117/17.5; 427/19, 56, 256

[56] References Cited

U.S. PATENT DOCUMENTS

| | | | |
|---|---|---|---|
| 2,297,691 | 10/1942 | Carlson | 96/1.4 |
| 2,811,510 | 10/1957 | Leubner et al. | 117/17.5 X |
| 2,990,280 | 6/1961 | Giaimo | 96/1 R |
| 3,038,799 | 6/1962 | Metcalfe et al. | 96/1.3 |
| 3,041,168 | 6/1962 | Wielicki | 96/1 |
| 3,128,198 | 4/1964 | Dulmage et al. | 117/17.5 |
| 3,203,801 | 8/1965 | Heiart | 96/115 |
| 3,234,017 | 2/1966 | Heyl et al. | 252/501 X |
| 3,318,698 | 5/1967 | Schwartz | 96/1.1 |

OTHER PUBLICATIONS

Minsk et al., Photosensitive Polymers, Journal of Applied Polymer Science, vol. II, No. 6, pp. 302–307 (1959).

*Primary Examiner*—Charles E. Van Horn
*Attorney, Agent, or Firm*—James J. Ralabate; Richard A. Tomlin; Max J. Kenemore

[57] ABSTRACT

Graphic reproductions are achieved by the image-wise modification of the triboelectric charging capability of a surface followed by the triboelectric charging of the modified surface to produce a charge pattern corresponding to an image. The charge pattern may be developed with finely divided colored electroscopic particles and the resulting colored image either fixed on the surface of the insulating member or transferred to a receiving surface and fixed thereon.

12 Claims, 2 Drawing Figures

IMAGE FORMATION AND DEVELOPMENT

Matter enclosed in heavy brackets [ ] appears in the original patent but forms no part of this reissue specification; matter printed in italics indicates the additions made by reissue.

This invention relates in general to electrostatography and more particularly to a new method for the reproduction of images based on the imagewise modification of the triboelectric charging capability of a surface.

Electrostatography encompasses the entire field of forming and utilizing latent electrostatic charge patterns to record and reproduce images in visible form. The field of electrostatography was pioneered by Chester F. Carlson when he disclosed in U.S. Pat. No. 2,297,691 the basic technique of one major sector of the electrostatographic field referred to as xerography. In the most commonly practiced form of xerography, a photoconductive insulating layer is first given a uniform electrostatic charge over its entire surface and is then exposed to an image of activating electromagnetic radiation such as light which selectively dissipates the charge in illuminated areas of the photoconductive insulator, while charges in the nonilluminated areas are retained, thus forming a latent electrostatic image. This latent image may then be developed or made visible by the deposition of finely divided colored electroscopic marking particles on the surface of the photoconductive insulating layer, as a result of which the marking particles adhere to the surface of the photoconductive insulating layer only in areas of retained charge. This developed image may then be utilized in a number of diverse ways. For example, the image may be viewed in situ on the photoconductive insulator, fixed in place on its surface or transferred to a second surface such as a sheet of paper and fixed thereon as desired, depending upon whether the photoconductive insulating layer is reusable in the process or not. Hundreds of additional patents have issued in the field of xerography since the time of the original Carlson patents incorporating many improvements and modifications into the basic process and as a result of this development, xerography is today, by a great margin the largest commercial sector of electrostatography.

The other broad general branch of electrostatography is generally referred to as electrography and it is considered distinct from the xerographic branch in that it does not employ a photoconductor and light exposure to control the formation of its latent electrostatic charge pattern. Electrography as it is generally known today may be divided into two broad sectors which are, xeroprinting and TEST recording. Xeroprinting may be described as the electrostatic analog of ordinary printing. This process, which is more fully described in U.S. Pat. No. 2,576,047 to Schaffert, employs a xeroprinting plate made up of a pattern of insulating material on a conductive backing so that when the xeroprinting plate is charged, as with a corona discharge electrode, an electrostatic charge pattern is retained only on the patterned insulating sections of the plate. In TESI recording (an acronym stemming from the phrase "Transfer of Electrostatic Images") the electrostatic charge patterns conforming to the desired reproduction are formed on a uniform insulating layer by means of an electrical discharge between two or more electrodes on opposite sides of the insulating medium. By controlling the shapes, combinations and numbers of electrodes employed, charge patterns of almost any shape may be formed on the insulating material. In both xeroprinting and TESI recording, image development is by the same techniques employed in xerography.

The common feature of all of these electrostatographic systems is that they employ the lines of force from the electric field of a latent electrostatic image to control the deposition of the colored finely divided marking particles known as toner, thus forming a visible image corresponding to the charge pattern.

Now in accordance with the present invention there is provided a new method of forming a latent electrostatic image and an improved electrostatographic process in which reproduction is formed by the imagewise modification of the triboelectric charging capability of an insulating surface followed by triboelectric charging of the modified surface to produce a charge pattern corresponding to the image, and optionally development of the charge pattern with finely divided colored electroscopic particles and alternatively fixing the particles on the surface of the insulating member or transferring the particles to another copy surface and fixing thereon.

The above and still further features, objects, and advantages of the present invention will become apparent upon consideration of the following detailed disclosure of specific embodiments of the invention especially when taken in conjunction with the accompanying drawings, wherein.

Figure 1:
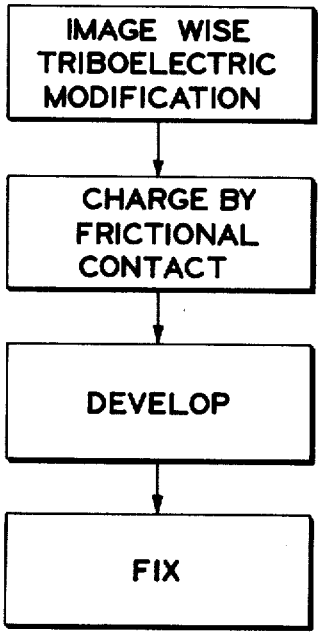
FIG. 1 is a flow sheet of the process steps of the invention.

Referring now to FIG. 1, it is seen that the first step of the process consists of modifying the surface of the layer upon which the image is to be formed in imagewise configuration so that areas of this surface which correspond to the image to be reproduced differ significantly in their triboelectric charging capabilities from the remainder of this surface. By way of background, it should be noted at this point that many materials may be charged by triboelectrification, that is to say, by rubbing them together with another material. Various materials have been arranged into a sequence known as the triboelectric series which is so arranged that any one of the materials is positively electrified or charged by rubbing it with any other material below it in the sequence. Conversely, any material in the triboelectric series may be negatively electrified or charged by rubbing it with any other material above it in the series. The degree of such electrification is governed by the distance between the material positions in the triboelectric series, that is to say, the greater the distance they are removed from one another in the series, the greater the mutual electrification or charging and the closer together they are in the series, the less the mutual electrification or charging. The present invention thus contemplates modifying all the image areas or all the nonimage areas of a surface upon which the image is to be formed so as to change the position of these modified areas in the triboelectric series with respect to the remainder of the imaging surface. In this way, when the imaging surface is rubber with a material which is distant in the triboelectric series from either the image or non-image areas, from this surface a differential charge pattern or latent electrostatic image is formed on the imaging surface.

This latent electrostatic image may then be used in a number of ways. For example, it may be read out by electrostatic charge sensing as with an electrometer for direct use or radio transmission to a distant point or it may be made visible by any one of a number of well known developing techniques as described hereinafter. The differential in triboelectrical charging susceptibility of image or non-image areas of the surface upon which the reproduction is to be formed may be established by a number of different techniques which are explained in greater detail in the examples given below. These techniques, however, may generally be grouped into two categories which are (1) charging the triboelectric charging susceptibility of the imaging surface itself in imagewise configuration or (2 ) coating the imaging surface in imagewise configuration with a thin layer of a second material remote from it in the triboelectric series. With either technique the object is to end up with either image or non-image areas having a position in the triboelectric series which is remote from the position in the triboelectric series of the material which is rubbed against the surface to charge it while other areas of the surface have a substantially different position in the triboelectric series with respect to this charging material.

In one of the exemplary techniques described below in the examples, the triboelectric charging susceptibility of the imaging surface is itself, modified by employing a polymerizable material as the image forming material and polymerizing or crosslinking the material in image configuration by photographic exposure where the material is photopolymerizable or by imagewise selective heating where the monomer can be polymerized (or a polymeric material can be crosslinked) by heating. This technique achieves the desired results because the polymer or crosslinked polymer has a different triboelectric charging susceptibility than the monomer or non-crosslinked polymer from which it is formed and the more highly polymerized the material is, the greater is this difference in triboelectric charging susceptibility. Since polymerization from a simple monomer and crosslinking of already formed polymeric units both serve to increase the molecular weight of the material acted upon, the verb "polymerize" and the noun "polymer" shall be used generically to include both of these concepts. Because triboelectric charging is based on a surface phenomenon, it is only necessary to modify a very thin layer of the surface of the imaging surface in order to achieve the desired results and this rule applies equally to modification of the material itself or to imagewise coating of the material as described above. Accordingly, it is only necessary to polymerize or crosslink a very thin surface layer of the material to achieve the desired results and polymerization or crosslinking throughout the bulk of the layer is unnecessary although it does not detract from the results in any way. This is most important since, with most photopolymerizable materials, electromagnetic radiation in the ultraviolet range is required to cause photopolymerization and the greatest part of this radiation is absorbed in a very thin top surface layer of the monomer causing polymerization to occur first in this top surface layer followed by later polymerization through the bulk of the material initiated by the small percentage of ultraviolet which penetrates into the layer. Since the process of the instant invention only requires surface polymerization it immediately becomes apparent that this system has a faster effective photographic speed than other imaging systems based on photopolymerization which require polymerization throughout the bulk of their imaging layers. Even though many photopolymerizable systems may be sensitized to electromagnetic radiation in the range of visible light they generally still remain most sensitive to UV light.

The fact that modification of only a thin surface layer of the image forming material is required in the process of the instant invention is also advantageous in the technique where surface coatings are employed to effect this change in imagewise configuration, since very thin layers of these coatings ranging to monomolecular in thickness may be effectively employed. In fact, these layers may be so thin that they may be thought of as almost surface contaminant layers. These "contaminants" may either be inert to, or reactive with the imaging surface. In fact, the "contaminant" may even be a catalyst or oxidizing agent for example, which serves to increase the molecular weight of the surface it contacts as by ordinary addition or condensation polymerization of the surface or by oxygen bridging polymerization of unsaturated molecules (this latter mechanism is believed to be the one responsible for the hardening of the drying oils).

Once the modification of triboelectric charging susceptibility of the image forming surface has been accomplished in imagewise configuration, the surface is triboelectrically charged by uniform frictional contact with a charging member. This charging may be accomplished by rubbing with glass, rubber, fur, metals, wool, other fabric or any other material selected according to its position in the triboelectric series with respect to the position in that series of image and non-image areas of the image forming layer so as to effect the desired charging pattern. Friction charging can also be achieved by the flow of a liquid or gas past the surface to be charged. In addition to rubbing the surface to be charged with one of the materials listed above, charging may be accomplished by cascading small beads of the material over the surface to be charged. This technique may employ coated "carrier" beads of the type described in U.S. Pat. No. 2,618,551 to Walkup, and depending upon the material employed for the surface coating of the beads, a positive or negative image may be formed.

In the following examples beads are referred to as type A where the position of their coatings in the triboelectric series is such that they will charge most materials which they rub against negatively and as type B where they will charge these materials positively. Typical type A beads are described in detail in Examples 4–7 of U.S. Pat. No. 2,618,551 and typical type B beads are described in Examples 1–3 of that patent. Image and non-image areas of the imaging surface may be on opposite sides of the charging material in the triboelectric series so that the charging material charges one positively and the other negatively, or, in the alternative both types of areas may be on one side of the charging material in the triboelectric series but separated from each other so that, for example, the charging material may render image areas more positive than non-image areas or more negative than non-image areas. Thus, image areas can be charged to 600 volts positive while non-image areas are charged to 300 volts positive by the triboelectrc charging of the friction charging material.

Once the image bearing surface has been triboelectrically charged by frictional contact with the charging material, this forming a latent electrostatic charge pattern, this charge pattern may, for example, be developed or made visible by the deposition thereon, of finely divided, electroscopic, colored marking particles, known in the electrostatographic art as "toner." It has also been shown that the side of the image bearing material opposite its charged surface may be developed because the electric field from the charge extends through the layer. Toners of this type generally range in size from about 3 to 30 microns with average particle sizes from about 4 to about 10 microns and in most cases are made up of pigmented, electrically insulating, thermoplastic resins; however, any of the conventional developing materials used in xerography may be employed to develop the latent electrostatic image formed by the method described above. Reference is hereby made to U.S. patents, Re. No. 25,136 to Carlson; 2,891,001 to Insalaco; 3,079,342 to Insalaco; 2,659,679 to Copley and 2,788,288 to Rheinfrank et al. for a more detailed disclosure of these toners. The developing process (as distinguished from the developing material or toner itself) may be accomplished using any one of a number of well known xerographic developing techniques such as brush development as described in U.S. 2,975,578 to Byrd, powder cloud development as described in U.S. 2,918,900 to Carlson, skid development as described in U.S. Pat. 2,895,847 to Mayo or immersion development wherein the toner particles are suspended in an insulating liquid as described in U.S. Pat. 3,010,842 to Ricker. Another development technique which may be employed is the cascade development technique which is, today, perhaps the most widely commercially used xerographic development technique. This development technique which is more fully described in U.S. Pat. Nos. 2,618,552 and 2,638,416 utilizes a two element developing mixture including the finely divided toner particles and grossly larger carrier beads of the same type as the coated beads described above for frictionally charging the imaging surface. These carrier beads serve both to maintain the fine toner particles deagglomerated and to charge them by virtue of the relative position of the toner and carrier materials in the triboelectric series and the constant rubbing together of these materials as the developing mixture is conveyed through the developing system. Since the carrier beads and toner particles tend to charge each other to opposite polarity the carrier beads collect the toner particles on their surfaces and carry them through the developing apparatus. When this mixture is cascaded over the surface bearing the latent electrostatic image, the electrostatic field from the charge pattern removes the toner particles from the carrier beads because its electrostatic attraction for the toner particles is stronger than that of the carrier beads in charged areas. Once the developing mixture has cascaded over the surface to be developed, the carrier beads along with any toner particles not employed in the development fall back into the bottom of an adjacent container for later recirculating in the developing process. Whenever this developer is recirculated, as described above, toner particles in the mixture are replenished periodically. It is also possible to combine charging and development with this and other types of developers where the developer is in frictional contact with the imaging surface during development, however, development usually takes a longer time with this combined technique because there is no charge on the imaging surface when the developer first contacts it. This technique has been experimentally proven with good results.

After the latent electrostatic image has been developed, it may be either transferred to another surface as by bringing the toner particle image into contact with an adhesive web or it may be transferred to an insulating web by electrostatic transfer as described in U.S. Pat. No. 2,576,047 to Schaffert. In the event that the toner particle image is not transferred to an adhesive surface, it is generally permanently attached to either the surface upon which it was originally formed or the surface to which it is transferred by fixing. This fixing may be accomplished by heating the toner particles to fuse them to their substrate when they are thermoplastic in nature or by subjecting them to solvent vapor fumes or by overcoating them with an adhesive material. In addition to developing the latent electrostatic image, as described above, the image may be read out by a scanning device capable of sensing the charge level in sequential image areas or it may be rendered visible by techniques such as charge induced plastic deformation. This latter technique involves forming the latent electrostatic image on a surface which is capable of forming a plastic deformation image or transferring the electrostatic image to such a surface and then softening the surface until the electrical field forces of the electrostatic image exceed the surface tension forces of the surface. Transfer of electrostatic images from one surface to another is described in Walkup Pat. No. 2,833,648. An exemplary process of plastic deformation imaging is described in more detail in U.S. patent application, Ser. No. 193,277, filed May 8, 1962, now Pat. No. 3,196,011.

The process of the invention was carried out in a number of experiments as described in the following examples:

In all examples the same toner which is described in detail in U.S. Pat. No. 3,079,342 to Insalaco was used both for a positively and a negatively charged developing material, only different types of carrier beads were used, as described above, to charge the toner particles to different polarities.

All exposures to ultraviolet light in the examples were one minute exposures with a Hanovia high pressure mercury arc lamp of 140 watts.

EXAMPLE I

A 1.5 mil biaxially oriented polyester film having the following chemical structure

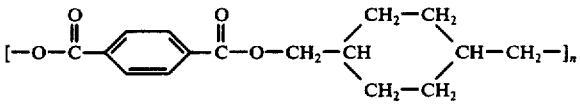

(1,4-bis methyl cyclohexane polyterephthalate)

and available from the Eastman Kodak Company of Rochester, New York under the tradename of "Kodar" was laid down on a support and a person's finger was brought into contact with the surface of the film, apparently leaving behind a surface contamination of body oils in the form of a finger print. The film was then friction charged by cascading a number of type B coated "carrier" beads across the surface of the Kodar and was developed with positively charged developer according to the cascade development technique as described above. This developed the areas of the Kodar to which body oils had been transferred while the use of negatively charged developer produced development in background areas.

EXAMPLE II

A 1.5 mil Kodar film was coated with a thin layer of KPR (Kodak Photoresist available from the Eastman Kodak Company of Rochester, New York). KPR may be described chemically as the cinnamate esters of polyvinyl alcohol and of cellulose. This polymer contains unsaturated side groups which may be caused to cross link upon exposure to form very large insoluble molecules and may be further sensitized by the presence of anthrones and their derivatives, polynuclear quinacridone derivatives and certain ketones such as Michlers ketone as more fully described in U.S. Pat. Nos. 2,670,285; 2,670,286; and 2,670,287 all to L. M. Minsk et al. The KPR film was dried and exposed to a light pattern corresponding to the image to be reproduced with a light source rich in ultraviolet. This resulted in the crosslinking and consequent insolubilizing of the KPR in exposed areas. Following exposure the KPR was washed with a trichloroethylene solvent to remove the KPR in unexposed areas and allowed to dry. This resulted in a Kodar film coated with KPR in exposed areas. The film surface was then friction charged by cascading type B coated charging beads over its surface. This served to charge KPR coated areas more positive than the Kodar background areas. When a negatively charged developing material (cascade type) was applied to this surface, KPR coated areas were developed and when a positively charged developer was used, the uncoated Kodar areas were developed. Both types of development produced good images. This experiment was also successively repeated using a polyethylene terephthalate substrate in place of the Kodar film.

EXAMPLE III

A thin layer of KPR was coated on the surface of a supporting substrate and exposed in the same manner as described in Example II, except that the unexposed surface areas of the KPR were not etched away with an organic solvent but instead the complete KPR surface including both exposed, crosslinked areas of the KPR and nonexposed areas were friction charged with type B coated charging beads which made unexposed areas more positive than exposed areas. Application of a negatively charged cascade developing material developed unexposed KPR areas.

EXAMPLE IV

A 1.5 mil Kodar film was laid over a printed page from a book and then exposed to a strobe light flash through the Kodar of sufficient intensity to cause the more volatile components of the ink to volatilize and evaporate across to the Kodar surface in the configuration of the printed copy. This coated Kodar was then friction charged with coated charging beads and developed with a cascade developing material as described in Example I with the same results.

EXAMPLES V-VIII

Four imaging surfaces were prepared exactly in accordance with the provisions of Examples I-IV except that instead of charging the surfaces which coated charging beads described in those examples, each of the surfaces was charged by rubbing it with a viscose rayon, long fibered, cotton-like material and was developed by cascade development as described above. Good quality positive and negative toner images of generally higher contrast were produced depending upon the polarity of the developer.

EXAMPLES IX-XII

Four films are prepared by exactly the same technique as that described in Examples I-IV except for the fact that charging was attempted wth a corona discharge electrode unit of the type described in U.S. Pats. 2,588,699, to Carlson and 2,836,725 to Vyverberg. Following this attempted charging procedure, both positively and negatively charged developers were applied to all four samples with the production of no visible image of any kind.

EXAMPLES XIII-XVI

Images were also formed by the same technique described in Examples I and IV on a ⅛" thick sheet of polymethyl methacrylate and on a 1.5 mil thick sheet of polyethylene terephthalate available from E. I. du Pont and Company under the tradename "Mylar." These materials produced images of about the same quality as the images formed with the Kodar film utilized in Examples I and IV.

EXAMPLES XVII-XIX

Samples of a 1.5 mil Kodar film, a Mylar brand polyethylene terephthalate film and a Lucite brand polymethyl methacrylate film were exposed to images with UV light. When these films were triboelectrically charged by rubbing with various materials there was a distinct difference in the charge on exposed and unexposed areas as indicated in the table below:

| Film | Rubbing material | Condition unexposed areas (v.) | Condition exposed areas (v.) |
|---|---|---|---|
| Kodar | Type B beads | +450 | −100 |
| " | Rayon | +425 | −100 |
| " | Type A beads | +20 | −150 |
| Mylar | Rayon | − | More − |
| " | Type A beads | − | More − |
| Lucite | Rayon | + | Less + |

Good quality positive and negative (photographically) images were developed on all surfaces after rubbing, with the type of image depending upon the polarity of the toner employed in development.

Additional experiments were run on KPR films to determine how exposure changes the films charging ability with different amounts of rubbing with rayon. It was found that a straight line relationship exists between the voltage on exposed film areas and voltage on unexposed film areas with each point plotted for increasing amounts of rubbing. The line was found to start at (0, 0) with no rubbing and run through a point equal to 2000 volts for exposed areas and 3000 volts for unexposed areas.

It is to be noted that the examples given above are exemplary only and are in no way intended to be limiting upon the invention since many other alternative materials and techniques which now become obvious may be substituted for the specific materials employed in the examples. Thus, for example, instead of charging a polymethyl methacrylate layer by rubbing it with a viscose rayon it may be charged by rubbing with a material even more remote from it than rayon in the triboelectric series such as rubber or polyethylene. In addition, a surface contaminant may be transferred to the imaging sheet through a stencil or by pressing it against a printed or typed page with heat and/or pressure, by directly typing or printing the contaminant on the image forming surface, by electrostatic transfer or by other techniques with or without intermediate transfer.

Figure 2:
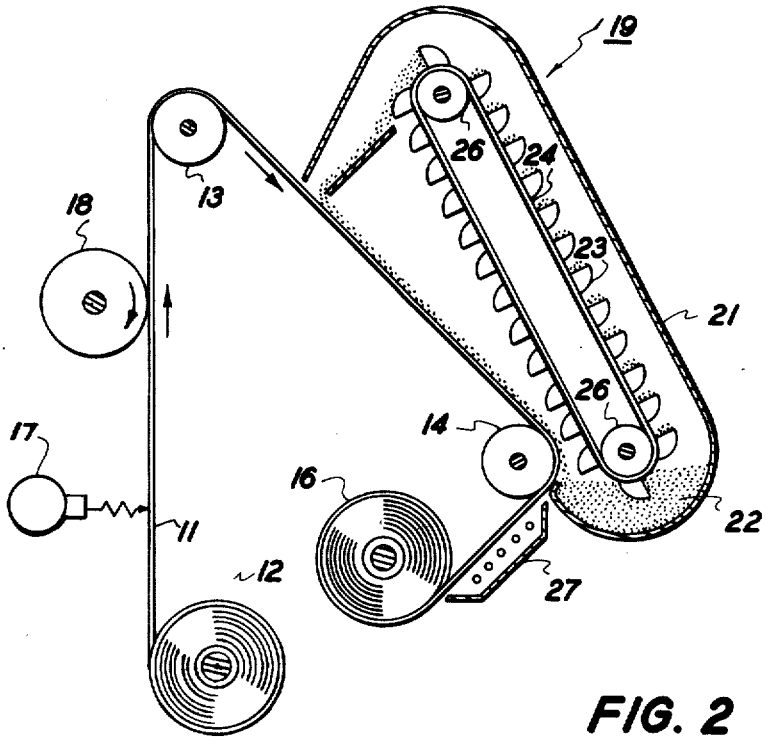
FIG. 2 is a side-sectional view of an apparatus employing one of the process embodiments of the present invention.

Referring now to FIG. 2 there is shown a copying apparatus embodying the concept of this invention in which the imaging surface 11 is fed up from a supply roll 12 around idle rollers 13 and 14 to a take-up roll 16, in the meantime passing the process stations of the apparatus. In this particular instance, the imaging surface 11 consists of a substrate layer coated with a thin coating of KPR as described above. As the imaging surface begins its movement through its path of travel in the apparatus, it passes a projector 17 which projects a light image of the original to be reproduced on the imaging surface with light which is rich in ultraviolet. This projector may either employ a flash exposure with light of sufficient intensity to crosslink exposed portions of the KPR Layer on the imaging surface 11 as it moves past the projector or in the alternative, a weaker light source may be employed providing that the imaging surface is stopped opposite the projector at intervals to allow for a longer exposure. Once the imaging surface 11 has been exposed, it continues on in its path of movement until it comes opposite a triboelectric charging roller 18 which serves to charge the imaging surface producing a differential charge pattern on it as described above in connection with the examples. This charging roller preferably rotates in a direction such that its periphery moves opposite the direction of movement of the imaging surface and at a speed sufficient to impart a significant charge to the imaging surface. Actually, the direction of rotation is not critical so long as the roller 18 may have a surface coating of any of the materials described above such as viscose rayon, nylon, wool or the like. This frictional rubbing serves to form a differential charge pattern on exposed and unexposed areas of the KPR layer as described in Example III above. Once charging has been completed, the imaging web continues on, moving past a cascade developing unit generally designated 19. The cascade unit includes an outer container or cover 21 with a trough at its bottom containing a supply of the two component developing material 22. This developing material is picked up from the bottom of the trough and dumped or cascaded over the surface of the imaging web 11 by a number of buckets 23 on an endless driven conveyor belt 24 which rotates about two pulleys 26. As stated above, the cascade development technique is more fully described in U.S. Pat. No. 2,618,552 and utilizes a mixture including finely divided, colored toner particles, and grossly larger carrier beads with a surface coating of the type described above in connection with FIG. 1. The carrier beads serve both to maintain the fine toner particles deagglomerated and to charge them when the materials are tumbled together in the developing system by virtue of the relative positions of the toner and carrier materials in the triboelectric series. Since the carrier beads and toner particles acquire charge of opposite polarity, the toner particles tend to cling to the carrier beads after triboelectric charging has taken place. By charging either the coating on the carrier beads or the material from which the toner particles are fabricated so that the toner particles are moved from below, the carrier bead coating material to above this material in the triboelectric series, the polarity of charge imparted to the toner particles by this frictional charging may be reversed so that the positive toner particles may be employed to develop a negatively charged image on the imaging surface 11 or negatively charged toner particles may be employed to develop a positively charged image. Alternatively, the toner particles may be charged to the same polarity as the polarity of the image on the imaging surface 11 so that the toner particles will be repelled by these charged areas and will be deposited only upon uncharged areas thereby producing a photographic reversal image. At any event when toner particles and imaging surfaces are charged opposite in polarity, the charged image areas pull toner particles off the carrier beads when the carrier bead-toner particles developing mixture is cascaded over this surface. The carrier beads along with any toner particles not used in developing the image then fall back into the bottom trough of container 21 and the developed image continues around in its path until it comes opposite a fixing unit 27 which serves to fuse or permanently fix the toner image to the imaging surface. In this case a resistance type radiant heating unit is illustrated as this type of unit has proved to be most effective in fixing toner particles including thermoplastic materials which may be heat fused to the imaging surface 11; however, other techniques known in the art may be utilized including the subjection of the toner image to a solvent vapor or the spraying of the toner image with an adhesive overcoating.

What is claimed is:

1. The method of forming a visible image comprising exposing an imaging sheet having at least a surface layer of an ultraviolet light photopolymerizable material to an imagewise exposure with ultraviolet light of sufficient intensity to cause polymerization of at least the surface of said photopolymerizable material, bringing said imagewise polymerized surface into frictional contact with a material remote in the triboelectric series from at least one of the polymerized and the unpolymerized portions of said imaging sheet so that a differential charge pattern is set up between image and non-image areas on said sheet *as a consequence of an imagewise change in triboelectric charging susceptibility, due to said imagewise polymerization, and said contact,* and developing said charge surface by depositing finely divided, colored, electroscopic marking particles thereon.

2. The method according to claim 1 in which said photopolymerizable material is polyethylene terephthalate.

3. A method according to claim 1 in which said photopolymerizable material includes the cinnamate esters of polyvinyl alcohol and of cellulose.

4. The method according to claim 1 in which said photopolymerizable material is 1,4-bis methyl cyclohexane polyterephthalate.

5. The method of forming a latent electrostatic image on an imaging layer comprising increasing the molecular weight of at least a surface of said layer by subjecting it to a polymerizing influence in imagewise configuration thereby modifying the triboelectric charging susceptibility of said surface in imagewise configuration and bringing said surface into frictional contact with a material remote in the triboelectric series from at least one of the modified and the unmodified portions of said surface so that a differential charge pattern is set up between image and non-image areas on said surface *as a*

*consequence of said imagewise change in triboelectric susceptibility and said contact.*

6. A method of forming a latent electrostatic image on an imaging layer comprising coating a surface of said layer with a contaminant comprising a material selected from the group consisting of an oil based ink and human body oils in imagewise configuration thereby modifying the triboelectric charging susceptibility of said surface in imagewise configuration and bringing said surface into frictional contact with a material remote in the triboelectric series from at least one of the modified and unmodified portions of said surface so that a differential charge pattern is set up between image and non-image areas of said surface *as a consequence of said imagewise change in triboelectric susceptibility and said contact.*

7. The method of reproducing a page of copy formed with an oil based ink comprising placing said page of copy in face to face relationship with an imaging surface, heating at least the inked portions of said page of copy until at least a portion transfers across to said imaging surface in imagewise configuration by volatilization and condensation of at least one of the ink components which [is capable of modifying] *modifies* the triboelectric charging susceptibility of said imaging surface, separating said imaging surface from said page of copy, bringing said imaging surface into frictional contact with a material remote in the triboelectric series from at least the ink coated portion of said imaging surface or the non-coated portion of said imaging surface so that a differential charge pattern is set up between image and non-image areas on said imaging surface *as a consequence of said modified triboelectric charging susceptibility and said contact,* and developing said surface by depositing finely divided, colored, electroscopic marking particles thereon.

8. A method according to claim 7 in which said page of copy is right reading and said imaging surface is transparent whereby the mirror reversed image produced on said imaging surface may be easily read through its back.

9. The method of reproducing a page of copy formed with an oil based ink comprising placing said page of copy in face to face relationship with a smooth surfaced impervious master sheet, heating said page of copy and said master sheet until at least a portion of the ink from said page of copy volatilizes and recondenses on said master sheet in imagewise configuration, separating said master sheet and said page of copy, placing said master sheet in face to face relationship with an imaging surface, heating said master sheet and said imaging surface until at least a portion of the ink on said master surface volatilizes and recondenses on said imaging surface in imagewise configuration, *said imaging surface ink portion modifying the triboelectric charging susceptibility of said surface,* separating said master sheet from said imaging surface, bringing said imaging surface into frictional contact with a material remote in the triboelectric series from at least one of the ink coated and the uncoated portions of said imaging surface so that a differential charge pattern is set up between image and non-image areas on said imaging surface *as a consequence of said modified triboelectric charging susceptibility and said contact,* and developing said surface by depositing finely divided, colored, electroscopic marking particles thereon.

10. A method according to claim 9 in which said original page copy is right reading and said imaging surface is transparent whereby the mirror reversed image produced on said imaging surface may be easily read through its back.

11. The method of forming a reproduction of a page of copy formed with an oil based ink comprising placing said page of copy in face to face relationship with an imaging surface, pressing the two surfaces together with sufficient force to *imagewise* transfer at least a portion of the ink from said page of copy to said imaging surface, *said ink portion modifying the triboelectric charging susceptibility of said imaging surface,* separating said page of copy from said imaging surface, bringing said imaging surface into frictional contact with a material remote in the triboelectric series from at least one of the ink coated and the uncoated portions of said imaging surface so that a differential charge pattern is set up between image and non-image areas on said imaging surface *as a consequence of said imagewise change in triboelectric susceptibility and said contact,* and developing said surface by depositing finely divided, colored, electroscopic marking particles thereon.

12. The method of reproducing an image on a sheet of copy formed with an oil based ink comprising placing said copy sheet in face to face relation with a smooth surfaced master sheet, applying sufficient pressure to said sheets so that at least a portion of the ink is transferred to said master, separating said master from said sheet of copy, bringing said master into face to face contact with an imaging surface, applying sufficient pressure to said master and said imaging surface so that at least a portion of said ink transferred to said master is retransferred to said imaging surface in imagewise configuration, *said retransferred ink portion modifying the triboelectric charging susceptibility of said imaging surface,* separating said imaging surface from said master, bringing said imaging surface into frictional contact with a material remote in the triboelectric series from at least one of the ink coated and non-coated portions of said imaging surface so that a differential charge pattern is set up between image and non-image areas on said imaging surface *as a consequence of said imagewise change in triboelectric susceptibility and said contact,* and developing said surface by depositing finely divided, colored, electroscopic marking particles thereon.

*13. The method of forming a latent electrostatic image on an imaging layer comprising modifying the triboelectric charging susceptibility of a surface of said layer in imagewise configuration by means of imagewise contaminating said surface with human body oils and bringing said imaging surface into contact with a material remote in the triboelectric series from at least one of the modified and the unmodified portions of said imaging surface so that a differential charge pattern is set up between image and non-image areas on said imaging surface as a consequence of said imagewise change in triboelectric susceptibility and said contact.*

* * * * *